US008959229B1

(12) United States Patent
Grasselt et al.

(10) Patent No.: US 8,959,229 B1
(45) Date of Patent: Feb. 17, 2015

(54) INTELLIGENTLY PROVISIONING CLOUD INFORMATION SERVICES

(71) Applicant: International Business Machines Corporation, Armonk, NY (US)

(72) Inventors: Mike Grasselt, Leinfelden-Echterdingen (DE); Albert Maier, Tuebingen (DE); Martin Oberhofer, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/133,701

(22) Filed: Dec. 19, 2013

(51) Int. Cl.
*G06F 15/173* (2006.01)
*H04L 12/911* (2013.01)
*G06N 5/02* (2006.01)

(52) U.S. Cl.
CPC . *H04L 47/70* (2013.01); *G06N 5/02* (2013.01)
USPC .......................................................... 709/226

(58) Field of Classification Search
USPC ........................................ 709/226, 224, 220
See application file for complete search history.

(56) References Cited

U.S. PATENT DOCUMENTS

| 8,630,884 | B2 * | 1/2014 | Carter | 705/7.11 |
| 2013/0007753 | A1 * | 1/2013 | Jain | 718/103 |

OTHER PUBLICATIONS

Lee et al., "Profit-driven Service Request Scheduling in Clouds", Technical Report 646, School of Information Technologies, The University of Sydney, Nov. 2009.
Mao et al., "Auto-Scaling to Minimize Cost and Meet Application Deadlines in Cloud Workflows", SC11, Nov. 12-18, 2011, Seattle, Washington, USA, Copyright 2011, ACM 978-1-4503-0771-0/11/11 . . . $10.00.
U.S. Appl. No. 14/463,924, filed Aug. 20, 2014 entitled "Intelligently Provisioning Cloud Information Services".

* cited by examiner

*Primary Examiner* — Vivek Srivastava
*Assistant Examiner* — Normin Abedin
(74) *Attorney, Agent, or Firm* — Edward Li

(57) ABSTRACT

A computer-implemented method, computer program product, and computer system for intelligently provisioning cloud information services. The computer system determines a target computing zone based on location constraints defined in service processing rules, in response to receiving service request. The computer system determines whether a merger or a split is needed, based on a score for the resources, scores for the respective processing nodes, and operational metadata. The computer system determines whether request processing constraints defined in the service processing rules allow the merger or the split. The computer system processes, in the target computing zone, the service request with the merger or the split, in response to determining that the merger or the split is needed and in response to determining that the request processing rules allow the merger or the split.

6 Claims, 4 Drawing Sheets

| Service Processing Rules Editor | | |
|---|---|---|
| Service A | Service B | - Resource Metrics |
| Service B | Resource consumption score formula | -Design |
| Service C | #records * (CPU/rec + mem/rec + IO/rec) | # operators |
| Service D | + 2 * (#DB lookups + #operators) | # external serv. |
| Service E | | # transformations |
| Service F | | # DB lookups |
| Service ... | | -Operational |
| | | CPU/rec |
| | | mem/rec |
| | | IO/rec |
| | | # records |
| | Location constraints | - Location attributes |
| | Tenant 1 | Entity 1 | Computing Zone Z3 | + Tenants |
| | Tenant 1 | Entity 2 | Computing Zone Z3 | + Entities |
| | Tenant 4 | Entity 7 | Computing Zone Z5 | + Computing Zones |
| | Request processing constraints | - Processing attributes |
| | Can be split | Split allowed |
| | | Split not allowed |
| | | Merger allowed |
| | | Merger not allowed |

FIG. 2

INTELLIGENTLY PROVISIONING CLOUD INFORMATION SERVICES

TECHNICAL FIELD OF THE INVENTION

The present invention relates generally to cloud computing, and more particularly to intelligently provisioning cloud information services.

BACKGROUND

Today, consumers of information services in a cloud infrastructure expect that certain Quality of Service (QoS) is fulfilled. The information services wrap ETL (Extract, Transform, and Load) functions, such as address standardization, matching and de-duplication, transcoding, cross-referencing, transformation, or cleansing into re-usable services. An ETL function (also known as a job) usually includes a number of operators, such as database connectors, pivot operators, standardization operators, etc. From a cloud service provider perspective, the challenges in information services are the following. (1) One challenge is atomicy. Some tasks (such as de-dublication) are set operations, which cannot be split. Other tasks (such as address standardization) are individual record operations. Since each service call has a service call processing overhead, it will be beneficial if this overhead is not paid more often then necessary. Thus, it will be ideal that these individual record operations are grouped together for batch processing, as long as the response time QoS is not violated. A service call processing overhead can be substantial, because each ETL operator memory has to be allocated even if just a single row is processed. The memory consumption can be substantial. Tests with a state-of-art ETL system reveal that 12 GB of memory can be easily exhausted with approximately 150 ETL operators. (2) Another challenge is processing locations. In a cloud environment, particularly for large volumes of data, the processing locations matter. For the processing locations, there are only two options. One of the options is that the data is transferred to the processing locations; the other is that processing tasks come to locations where the data resides. In an example of data profiling, if a source system has several TB of data, it will be impractical to move it to the cloud service provider location because the transfer time will be too long; however, if the location of the data and the profiling task are far away from each other in network terms (e.g., throughput, geography, firewalls, etc.), the processing time will be long.

SUMMARY

Embodiments of the present invention provide a computer-implemented method, computer program product, and computer system for intelligently provisioning cloud information services. The computer system receives from a tenant service request for an entity, retrieves service processing rules. The service processing rules include location constraints, processing constraints for the service request, and a score formula. The computer system determines a target computing zone based on location constraints defined in the service processing rules, and sends the service request to a target computing zone. Based on the score formula, the computer system computes a score for resources required in the service request and scores for respective processing nodes. The computer system determines whether a merger or a split is needed, based on the score for the resources, the scores for the respective processing nodes, and operational metadata. The computer system determines whether request processing constraints defined in the service processing rules allow the merger or the split. The computer system processes, in the target computing zone, the service request with the merger or the split, in response to determining that the merger or the split is needed and in response to determining that the request processing rules allow the merger or the split.

BRIEF DESCRIPTION OF THE SEVERAL VIEWS OF THE DRAWINGS

FIG. 2 is a diagram showing a rules editor for a service request optimizer shown in FIG. 1, in accordance with one embodiment of the present invention.

DETAILED DESCRIPTION

An approach disclosed in embodiments of the present invention is as follows. A service request optimizer, upon receiving an information service request, determines, based on rules, whether the information service request can be grouped with other requests for optimization of processing the information service request. Therefore, processing the information service request uses fewer resources and avoids resource-intensive overhead. The idea introduces the ability for certain workloads to switch a paradigm of moving data to a processing logic location to a paradigm of moving processing logic to a location of the data. The rules used by the service request optimizer are continuously improved through creating and analyzing operational metadata which captures resource utilization and information service processing characteristics such as rows processed, data volume processes, etc.

The benefits of the approach disclosed in embodiments of the present invention are as follows. The approach reduces the cost for an information service provider by more efficient use of computing resources. The approach improves QoS through smarter load distributions in which a certain information service request is pushed to a subset of the nodes at which resources are not relatively utilized fully. The approach monitors operation metrics and provides analytics based thereon; therefore, the approach continuously improves the rules used by the service request optimizer. The approach improves fulfillment of SLA (Service Level Agreement) by subsetting the nodes. Through subsetting the nodes, a heavy information service does not affect negatively the performance of other information services and does not cause SLA violations.

Embodiments of the present invention will now be described in detail with reference to the accompanying drawings.

Figure 1:
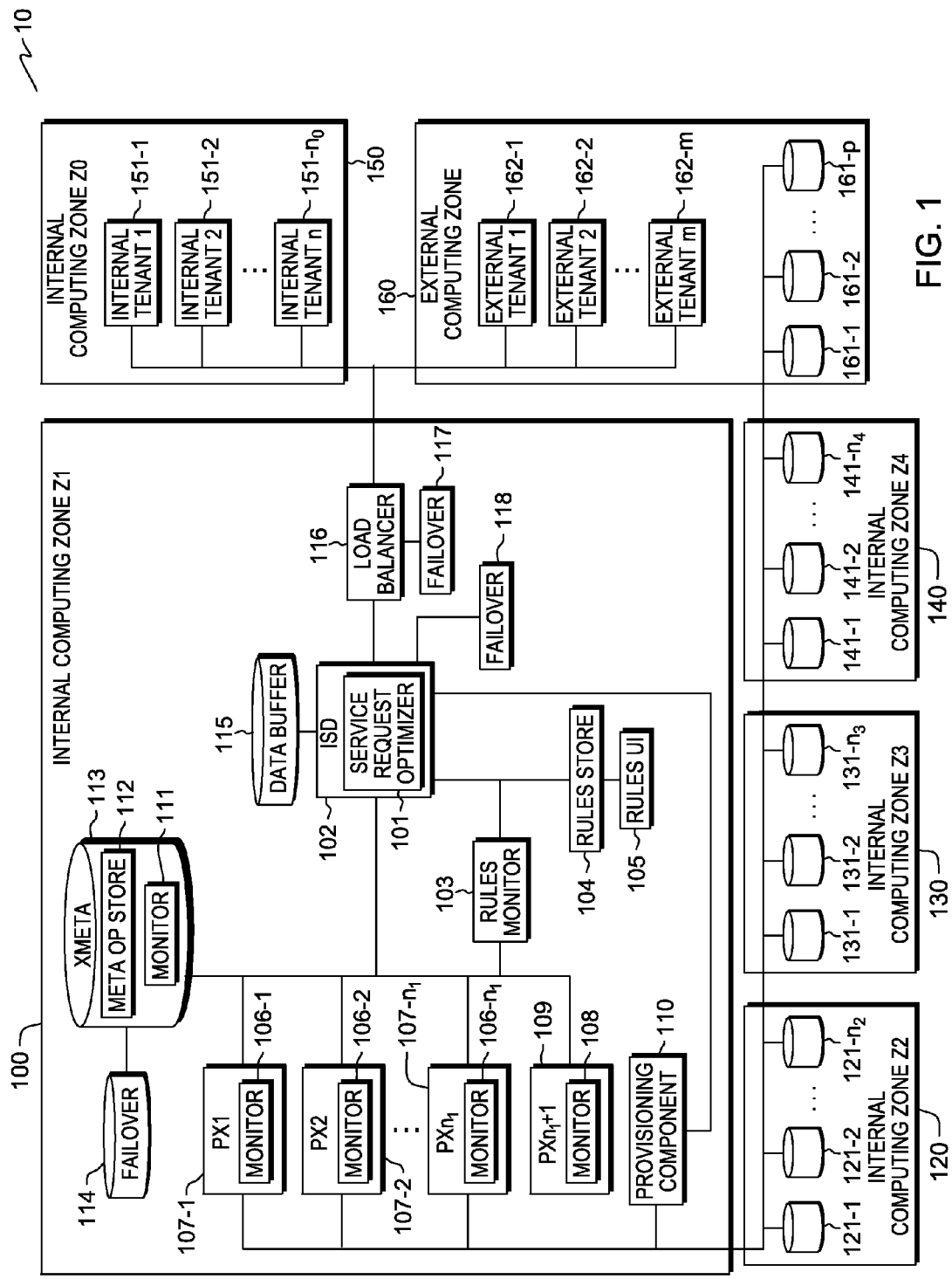
FIG. 1 is a diagram illustrating components of an information integration platform, in accordance with one embodiment of the present invention.

FIG. 1 is a diagram illustrating components of information integration platform 10, in accordance with one embodiment of the present invention. Information integration platform 10 includes internal computing zone Z0 150, internal computing zone Z1 100, internal computing zone Z2 120, internal computing zone Z3 130, internal computing zone Z4 140, and external computing zone 160.

Internal computing zone Z0 150 includes a plurality of internal tenants (internal tenant 1 151-1, internal tenant 2 151-2, through internal tenant $n_0$ 151-$n_0$, where $n_0$ is an integer number.). Respective ones of the internal tenants, in internal computing zone Z0 150, make information service requests. In external computing zone 160, respective ones of external tenants (external tenant 1 162-1, external tenant 2 162-2, through external tenant m 162-$m$, where m is an integer number) make information service requests.

Internal computing zone Z2 120 includes a plurality of databases (database 121-1, database 121-2, through database 121-$n_2$, where $n_2$ is an integer number). Internal computing zone Z3 130 includes a plurality of databases (database 131-1, database 131-2, through database 131-$n_3$, where $n_3$ is an integer number.). Internal computing zone Z4 130 includes a plurality of databases (database 141-1, database 141-2, through database 141-$n_4$, where $n_4$ is an integer number.). Also, external computing zone 160 includes a plurality of databases (database 161-1, database 161-2, through database 161-$p$, $p$ is an integer number.).

Internal computing zone Z1 100 includes a plurality of processing nodes, namely, PX1 107-1, PX2 107-2, through $PXn_1$ 107-$n_1$, where $n_1$ is an integer number. In internal computing zone Z1 100, $PXn_1+1$ 109 is a processing node added to internal computing zone Z1 100 when the system resources are frequently exhausted. $PXn_1+1$ 109 is added by provisioning component 110.

Internal computing zone Z1 100 is the place of implementation of intelligently provisioning cloud information services. In the embodiment shown in FIG. 1, IBM InfoSphere® Information Server (IIS) is used for illustrating the implementation. Six components are added to IIS for the implementation. In other embodiments, other information integration platforms, such as Master Data Management (MDM), can be used.

It should be appreciated that FIG. 1 provides only an illustration of one implementation in the embodiment shown in FIG. 1. In another embodiment, internal computing zone Z1 100 may also include either databases or tenants, or both. In yet another embodiment, internal computing zone Z0 150 may further include either databases or components in internal computing zone Z1 100 shown in FIG. 1, or both. In yet another embodiment, internal computing zone Z2 120, internal computing zone Z3 130, or internal computing zone Z4 140 may further include either tenants or components in internal computing zone Z1 100 shown in FIG. 1, or both. In yet another embodiment, external computing zone may further include components in internal computing zone Z1 100 shown in FIG. 1.

The first one of the six components added to IIS is service request optimizer 101. Service request optimizer 101 is responsible for detecting whether a service request needs to be morphed into an internal service structure which is optimized from perspectives of processing speed, resource consumption, etc. In the embodiment of using IIS, service request optimizer 101 is within ISD 102. ISD 102 is InfoSphere® Information Service Director™.

The second one of the six components added to IIS is data buffer 115. Data buffer 115 is a persistent storage where service request optimizer 101 manages for each incoming service request so that records returned by processing nodes (PX1 107-1, PX2 107-2, through $PXn_1$ 107-$n_1$) can be returned to the right service request. It is of particular of relevance if data from several independent requests is bundled for batch processing. Data buffer 115 can be a database or a file system. It is conceivable that data buffer 115 can also be completely in-memory for performance reasons; however, for business resiliency reasons, it is feasible that any real implementation has a persistency aspect.

The third one of the six components added to IIS is meta op store 112. Meta op store 112 is an extension for the metadata persistency and capture operational metadata required by service request optimizer 101 for decision making. In the embodiment of using IIS, meta op store 112 is an extension of XMETA repository 113. XMETA repository 113 is the metadata persistency in InfoSphere®.

The fourth one of the six components added to IIS is rules UI (User Interface) 105. Rules UI 105 allows an expert to select and/or modify default rule sets or to create rules from scratch. The fifth one of the six components added to IIS is rules store 104. Any rule accessible through rules UI 105 is persisted on rules store 104. Any rule in the rules store 104 can be used by service request optimizer 101 for decision making. The sixth one of the six components added to IIS is rules monitor 103. Rules monitor 103 observes the changes in monitored information and periodically updates parameters of the rules. The observation of the changes is through monitor 106-1 at PX1 107-1, monitor 106-2 at PX2 107-2, monitor 106-1$n_1$ at $PXn_1$ 107-1$n_1$, monitor 108 at $PXn_1+1$ 109, and monitor 111 at XEMTA 113. Any rule in rules store 104 is monitored by rules monitor 103. Rules monitor 103 periodically updates the parameters in rules store 104, based on the monitored information which includes operational metadata stored in meta op store 112 as well as monitored changes in the design time metadata stored in XMETA 113. Through updating the parameters based on monitoring data, scores for resources and the processing nodes are updated, and the decision making results made by service request optimizer 101 are based on these scores are fine-tuned.

Internal computing zone Z1 100 further includes load balancer 116 with its failover 117. Internal computing zone Z1 100 also includes failover 118 for ISD 102 and failover 114 for XMETA 113.

FIG. 2 is a diagram showing rules editor 200 for service request optimizer 101 shown in FIG. 1, in accordance with one embodiment of the present invention. For example, rules editor 200 includes rules for services A, B, C, D, E, F, and so on. FIG. 2 illustrates rules for service B. The rules for service B include a "resource consumption score formula", "location constraints", and "required processing constraints".

FIG. 2 shows the information used by service request optimizer 101. The information includes resource metrics which has two categories: design and operational. The design category includes the number of operators (#operators), the number of external services (#external serv.), the number of transformations, (#transformations), and the number of database lookups (#DB lookups); the operational category includes processor time for processing a single record (CPU/rec), memory consumption for processing a single record (mem/rec), IO usage for processing a single record (IO/rec), and the number of records processed by a service execution (#records). The information further includes location attributes: tenants, entities, and computing zones. The information yet further includes processing attributes: "split allowed", "split not allowed", "merger allowed", and "merger not allowed".

The service resource consumption is derived from operational metadata captured by operational monitoring and computed with the "resource score computation formula", either by a default formula or explicitly defined as shown in FIG. 2. For example, the "resource score computation formula" in FIG. 2 is as $$(\#records)*(CPU/rec+mem/rec+IO/rec)+2*((\#DB\ lookups)+(\#operators))$$

In the formula, the metadata includes the number of records processed by a service execution (#records), processor time for processing a single record (CPU/rec), memory consumption for processing a single record (mem/rec), IO usage for processing a single record (IO/rec), the number of database lookups in the service execution (#DB lookups), and the number of operators in the service execution (#operators).

The "location constraints" in rules editor 200 shown in FIG. 2 describe the computing zones to be used to process service requests for certain entities of certain tenants. For example, in service B shown in FIG. 2, computing zone Z3 is used to process service requests for entity 1 of tenant 1, computing zone Z3 is used to process service requests for entity 2 of tenant 1, and computing zone Z5 is used to process service requests for entity 7 of tenant 4.

The "request processing constraints" in rules editor 200 shown in FIG. 2 describes whether the service requests for a specific service can be merged or split. For example, for service B shown in FIG. 2, the "request processing constraints" is "split allowed". If the monitoring detects that service requests for a specific service are frequent, but the data volume is small and the specific service is marked as "merge allowed", the service request optimizer 101 can trigger the bundling of service requests. If the service requests for the specific service are not frequent, but the data volume is large and processing nodes are busy, and the specific service is marked as "split allowed", the service request optimizer 101 can trigger the split of service requests to avoid overloading of processing nodes.

Figure 3:
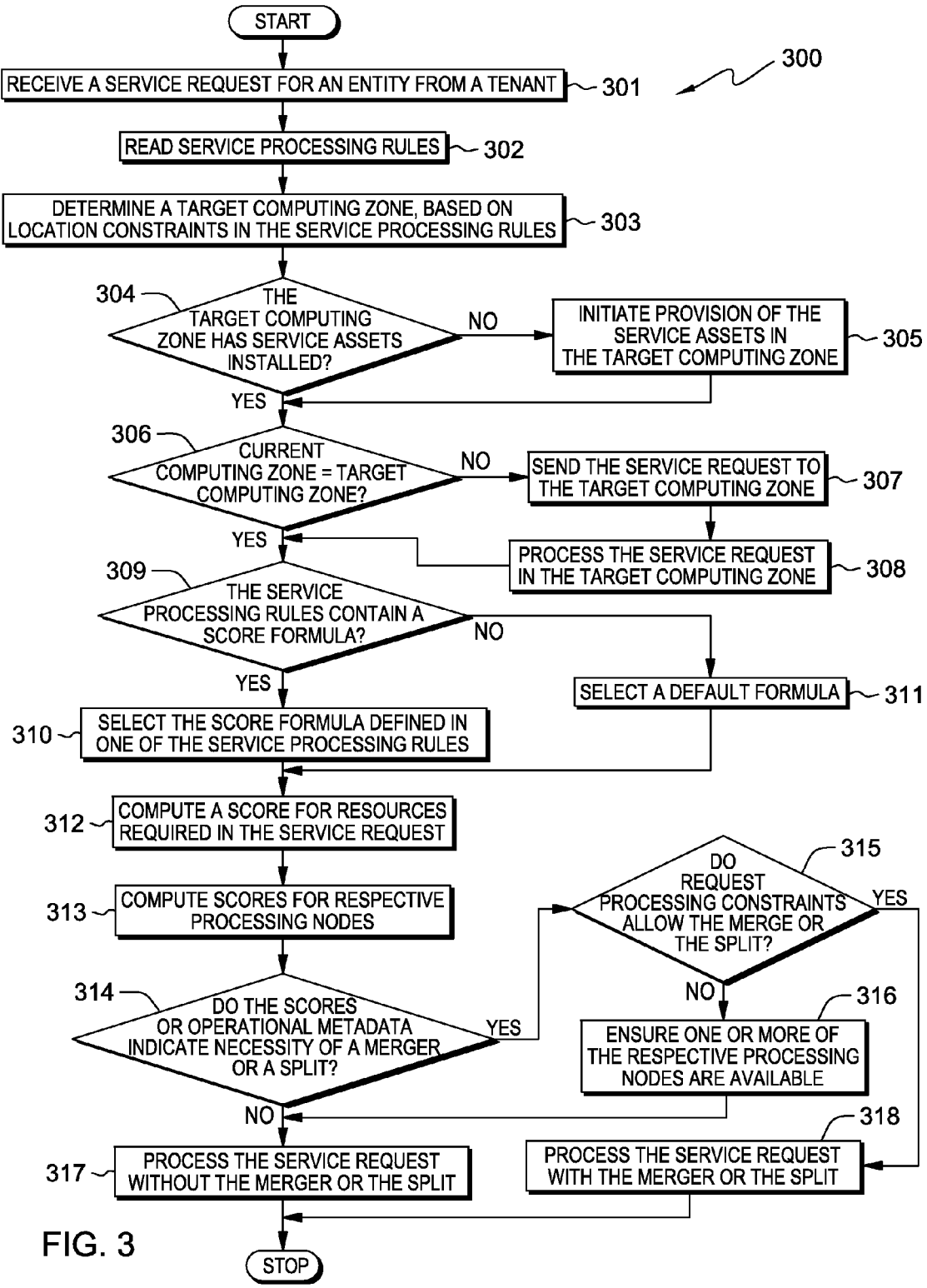
FIG. 3 is a flowchart illustrating operational steps of intelligently provisioning cloud information services, in accordance with one embodiment of the present invention.

FIG. 3 is flowchart 300 illustrating operational steps of intelligently provisioning cloud information services, in accordance with one embodiment of the present invention. The operational steps are implemented by service request optimizer 101 (shown in FIG. 1) which resides on computing device 400 shown in FIG. 4.

At step 301, service request optimizer 101 receives a service request for an entity from a tenant. The tenant is one of the internal tenants shown in FIG. 1 (internal tenant 1 151-1, internal tenant 2 151-2, through internal tenant $n_0$ 151-$n_0$, where $n_0$ is an integer number) or the external tenants shown in FIG. 1 (external tenant 1 162-1, external tenant 2 162-2, through external tenant m 162-$m$, where m is an integer number).

At step 302, service request optimizer 101 reads service processing rules from rules store 104 shown in FIG. 1. An example of the rules is shown in FIG. 2. At step 303, service request optimizer 101 determines a target computing zone, based on location constraints in the service processing rules. An example of the location constraints is shown in FIG. 2.

At decision block 304, service request optimizer 101 determines whether the target computing zone has service assets installed. In response to determining that the target computing zone does not have service assets installed ("NO" branch of decision block 304), service request optimizer 101, at step 305, initiates provision of the service assets in the target computing zone.

In response to determining that the target computing zone has service assets installed ("YES" branch of decision block 304) or after processing step 305, service request optimizer 101, at decision block 306, determines whether a current computing zone of the tenant is the target computing zone. In response to determining that current computing zone of the tenant is not the target computing zone ("NO" branch of decision block 306), service request optimizer 101, at step 307, sends the service request to the target computing zone. At step 308, service request optimizer 101 processes the service request in the target computing zone.

In response to determining that current computing zone of the tenant is the target computing zone ("YES" branch of decision block 306) or after step 308, service request optimizer 101, at decision block 309, determines whether the service processing rules contain a score formula. The score formula is used to calculate a resource consumption score; an example of the resource consumption score formula is shown in FIG. 2. In response to determining that the service processing rules do not contain the score formula ("NO" branch of decision block 309), service request optimizer 101, at step 311, selects a default formula. In response to determining that determining that the service processing rules contain the score formula ("YES" branch of decision block 309), service request optimizer 101, at step 310, selects the score formula which is defined in one of the service processing rules.

After step 310 or step 311, at step 312, service request optimizer 101 computes a score for resources required in the service request. The resources are, for example, CPU, memory, external services, and database lookups. At step 313, service request optimizer 101 computes scores for respective processing nodes (such as PX1 107-1, PX2 107-2, through $PXn_1$ 107-$n_1$ shown in FIG. 1). At decision block 314, service request optimizer 101 determines whether the scores (including the score for the resources and the scores for the respective processing nodes) or metadata indicate necessity of a merger or a split. The operational metadata, as discussed in a previous paragraph, includes processor time for processing a single record, memory consumption for processing a single record, IO usage for processing a single record, and the number of records processed by a service execution.

In response to determining that the scores or metadata do not indicate necessity of the merger or the split ("NO" branch of decision block 314), service request optimizer 101, at step 317, processes the service request without the merger or the split. In response to determining that the scores or metadata indicate necessity of the merger or the split ("YES" branch of decision block 314), service request optimizer 101, at decision block 315, determines whether request processing constraints allow the merger or the split. The request processing constraints are discussed in a previous paragraph and an example of the request processing constraints is shown in FIG. 2.

In response to determining that request processing constraints do not allow the merger or the split ("NO" branch of decision block 315), service request optimizer 101, at step 316, ensures one or more of the respective processing nodes are available. Then, service request optimizer 101 executes step 317 which is discussed in the last paragraph. In response to determining that request processing constraints allow the merger or the split ("YES" branch of decision block 315), service request optimizer 101, at step 318, processes the service request with the merger or the split.

Figure 4:
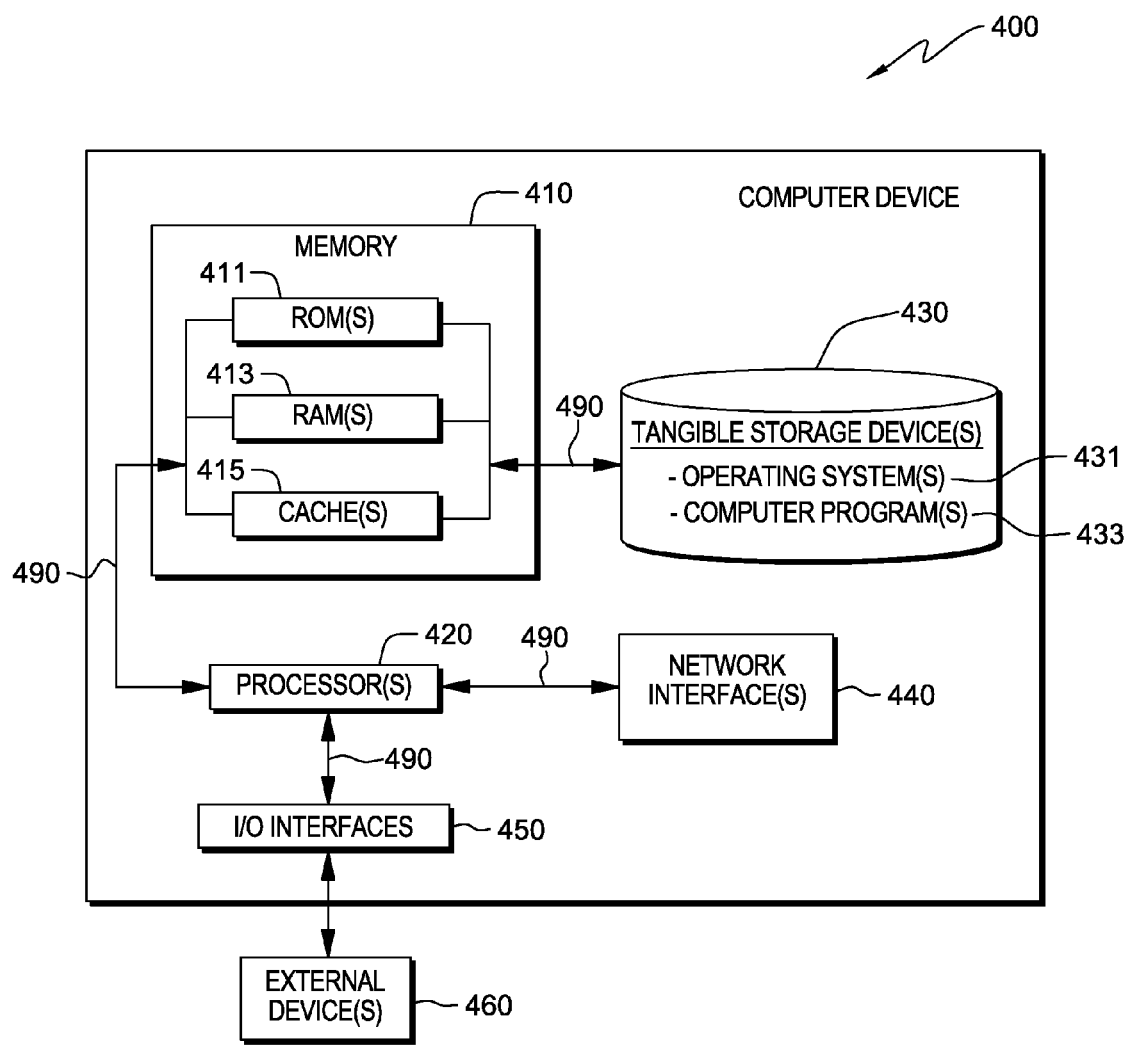
FIG. 4 is a diagram illustrating components of a computer system hosting one or more the components of the information integration platform shown in FIG. 1, in accordance with one embodiment of the present invention.

FIG. 4 is a diagram illustrating components of computer system 400 hosting one or more the components of the information integration platform 10, in one embodiment of the present invention. It should be appreciated that FIG. 4 provides only an illustration of one implementation and does not imply any limitations with regard to the environment in which different embodiments may be implemented.

Referring to FIG. 4, computer system 400 includes processor(s) 420, memory 410, tangible storage device(s) 430, network interface(s) 440, and I/O (input/output) interface(s) 450. In FIG. 4, communications among the above-mentioned components of computer system 400 are denoted by numeral 490. Memory 410 includes ROM(s) (Read Only Memory) 411, RAM(s) (Random Access Memory) 413, and cache(s) 415.

One or more operating systems 431 and one or more computer programs 433 reside on one or more computer-readable tangible storage device(s) 430. In the embodiment, service request optimizer 101 resides on at least one of one or more computer-readable tangible storage device(s) 430.

Computer system 400 further includes I/O interface(s) 450. I/O interface(s) 450 allow for input and output of data with external device(s) 460 that may be connected to computer system 400. Computer system 400 further includes network interface(s) 440 for communications between computer system 400 and a computer network.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by, or in connection with, an instruction execution system, apparatus, or device.

Program code embodied on a computer readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like, and conventional procedural programming languages, such as the "C" programming language, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for intelligently provisioning cloud information services, comprising:
receiving, from a tenant, service request for an entity;
retrieving service processing rules, the service processing rules including location constraints, processing constraints for the service request, and a score formula;

determining a target computing zone, based on location constraints defined in the service processing rules;

sending the service request to a target computing zone;

computing a score for resources required in the service request, based on the score formula;

computing scores for respective processing nodes, based on the score formula;

determining whether a merger or a split is needed, based on the score for the resources, the scores for the respective processing nodes, and operational metadata;

determining whether request processing constraints defined in the service processing rules allow the merger or the split; and processing, in the target computing zone, the service request with the merger or the split, in response to determining that the merger or the split is needed and in response to determining that the request processing rules allow the merger or the split.

2. The computer-implemented method of claim 1, further comprising:

processing, in the target computing zone, the service request without the merger or the split, in response to determining that the merger or the split is not needed.

3. The computer-implemented method of claim 1, further comprising:

in response to determining that the request processing rules do not allow the merger or the split, ensuring one or more of the respective processing nodes are available; and processing, in the target computing zone, the service request without the merger or the split.

4. The computer-implemented method of claim 1, further comprising:

determining whether the target computing zone has service assets installed; and initiating provision of the service assets in the target computing zone, in response to determining that the target computing zone does not have service assets installed.

5. The computer-implemented method of claim 1, further comprising:

determining whether the service processing rules contain a score formula;

selecting the score formula defined in one of the service processing rules, in response to determining that the service processing rules contain the score formula; and selecting a default formula, in response to determining that the service processing rules do not contain the score formula.

6. The computer-implemented method of claim 1, further comprising: improving the service processing rules through analyzing the operational metadata.

* * * * *